United States Patent [19]

Hisamitsu et al.

[11] Patent Number: 5,768,451
[45] Date of Patent: Jun. 16, 1998

[54] CHARACTER RECOGNITION METHOD AND APPARATUS

[75] Inventors: Toru Hisamitsu, Higashimatsuyama; Yoshihiro Shima, Tokorozawa; Katsumi Marukawa, Kodaira; Hiroaki Shimokawabe, Odawara; Yoshihiko Nitta, Sagamihara, all of Japan

[73] Assignee: Hitachi, Ltd, Tokyo, Japan

[21] Appl. No.: 867,774

[22] Filed: Jun. 2, 1997

Related U.S. Application Data

[63] Continuation of Ser. No. 357,669, Dec. 16, 1994, abandoned.

[30] Foreign Application Priority Data

Dec. 22, 1993 [JP] Japan .................................. 5-323699

[51] Int. Cl.$^6$ .............................. G06K 9/03; G06F 17/20; G06F 17/27
[52] U.S. Cl. .................. 382/309; 364/419.1; 364/419.08
[58] Field of Search .................. 364/419.08, 419.1, 364/419; 382/309

[56] References Cited

U.S. PATENT DOCUMENTS

| | | | |
|---|---|---|---|
| 5,109,509 | 4/1992 | Katayama et al. | 395/600 |
| 5,225,981 | 7/1993 | Yokogawa | 364/419 |
| 5,251,129 | 10/1993 | Jacobs et al. | 364/419.08 |
| 5,329,609 | 7/1994 | Sanada et al. | 395/2.6 |
| 5,424,947 | 6/1995 | Nagao et al. | 364/419.08 |
| 5,448,474 | 9/1995 | Zamora | 364/419.1 |

OTHER PUBLICATIONS

Linguistic Error Correction of Japanese Sentences, T. Kawada et al., Proc. of 8th Intl. Conf. on Computational Linguistics, pp. 257–261 (1980).

Postprocessing Algorithm Baded on the Probabilistic and Semantic Method for Japanese OCR, K. Akiko et al.—Proc. of 2nd Intl. Conf. on Document Analysis and Recognition, pp. 646–649 (1993).

A Uniform Treatment of Heuristic Methods for Morphological Analysis of Written Japanese—T. Hisamitsu et al.—The 2nd Japanese–Australia Joint Symposium on Natural Language Processing, Oct. 2–5, 1991, pp. 46–57.

An Efficient Treatment of Japanese Verb Inflection for Morphological Analysis Proc. of 15th Intl. Conf. on Computational Linguistics, pp. 194–200 (1994).

An Efficient OCR Error Correction Method for Japanese Text Recognition Proc. of IAPR Workshop on Machine Vision Application, pp. 435–438 (1994).

Optimal Techniques in OCR Error Correction for Japanese Texts—Proc. of 3rd Intl. Conf. on Document Analysis and Recognition, pp. 1014–1021 (1996).

M. Shibatani—The Language of Japan, Cambridge University Press (1990).

*Primary Examiner*—Andrew W. Johns
*Assistant Examiner*—Monica S. Davis
*Attorney, Agent, or Firm*—Fay Sharpe Beall Fagan Minnich & McKee

[57] ABSTRACT

A character recognition method is arranged to supplement an erroneously recognized character with a linguistic knowledge. In this method, the extraction of a candidate based on the search of a word dictionary occupies a large part of the operation. To speed up the extraction of a candidate word, therefore, the method is provided to search the dictionary by using a group of candidate characters or a dictionary header for processing an inflected form of a verb. Further, the present method is provided for calculating a word matching cost for improving an efficiency of modifying an erroneous recognition. The word search is done by using a "hybrid method" arranged of "candidate-character-driven word extraction" and "dictionary-driven word extraction". Moreover, the word-dictionary is arranged to have a header word composed of an inflectional ending of a verb and an auxiliary verb or a particle added to the tail of the inflectional ending. The present method attaches much importance to the difference of the matching cost about a character with a totally high confidence ratio than the difference of the matching cost about a character with a totally low confidence ratio.

7 Claims, 20 Drawing Sheets

|  | FIRST CANDIDATE | CONFIDENCE RATIO | SECOND CANDIDATE | CONFIDENCE RATIO | | | N-TH CANDIDATE | CONFIDENCE RATIO |
|---|---|---|---|---|---|---|---|---|
| FIRST CHARACTER POSITION → | 禾 | 190 | (米) | 190 | 未 176 | 采 166 | 本 | 165 |
| SECOND CHARACTER POSITION → | (国) | 201 | 囲 | 174 | 固 165 | 図 164 | 園 | 158 |
| THIRD CHARACTER POSITION → | (産) | 208 | 塵 | 172 | 彦 168 | 崖 160 | 屋 | 159 |
| FOURTH CHARACTER POSITION → | (の) | 229 | ○ | 171 | ○ 171 | ○ 170 | o | 163 |
| FIFTH CHARACTER POSITION → | (ト) | 181 | ト | 171 | K 114 | お 111 | 長 | 111 |
| SIXTH CHARACTER POSITION → | ヴ | 215 | (ウ) | 204 | ゥ 165 | う 159 | う゛ | 156 |
| · · · → | (毛) | 199 | 毛 | 163 | 干 157 | そ 150 | 壬 | 149 |
| → | (口) | 206 | 口 | 202 | ワ 166 | ワ 160 | コ | 157 |
| → | (コ) | 204 | ロ | 178 | フ 173 | ロ 161 | ヨ | 155 |
| → | (シ) | 200 | ッ | 136 | ツ 133 | ジ 130 | ソ | 129 |
| → | (や) | 173 | や | 170 | 々 139 | ヤ 128 | ヤ | 126 |

FIG. 2A

| | FIRST CANDIDATE | CONFIDENCE RATIO | SECOND CANDIDATE | CONFIDENCE RATIO | ... | ... | N-TH CANDIDATE | CONFIDENCE RATIO |
|---|---|---|---|---|---|---|---|---|
| FIRST CHARACTER POSITION | 禾 | 190 | (米) | 190 | 未 176 | 朵 166 | 本 | 165 |
| SECOND CHARACTER POSITION | (国) | 201 | 圃 | 174 | 固 165 | 図 164 | 園 | 158 |
| THIRD CHARACTER POSITION | (産) | 208 | 塵 | 172 | 彦 168 | 崖 160 | 屋 | 159 |
| FOURTH CHARACTER POSITION | (の) | 229 | ○ | 171 | ○ 171 | ○ 170 | | |
| FIFTH CHARACTER POSITION | (ト) | 181 | ト | 171 | | | | |
| SIXTH CHARACTER POSITION | ヴ | 215 | (ウ) | 204 | ウ 165 | う 159 | う゛ | 156 |
| ⋮ | (モ) | 199 | 毛 | 163 | 千 157 | そ 150 | 壬 | 149 |
| | (口) | 206 | 口 | 202 | ワ 166 | ワ 160 | コ | 157 |
| | (コ) | 204 | ロ | 178 | フ 173 | 口 161 | ヨ | 155 |
| | (シ) | 200 | | | | | | |
| | (や) | 173 | や | 170 | タ 139 | ヤ 128 | ヤ | 126 |

| KEY (TO BE SEARCHED) |
|---|
| ト |
| ト |
| トヴ |
| トウ |
| ⋮ |
| トヴモロコシ |
| トウモロコシ |
| トゥモロコシ |
| トヴ毛ロコシ |
| ⋮ |

| WORDS (TO BE MATCHED) |
|---|
| トン |
| ⋮ |
| トイレ |
| ⋮ |
| トイレット |
| トインビー |
| トウシューズ |
| ⋮ |
| トウモロコシ |
| トースター |
| トースト |
| トーチカ |
| ⋮ |

ABOUT 100

FIG. 9

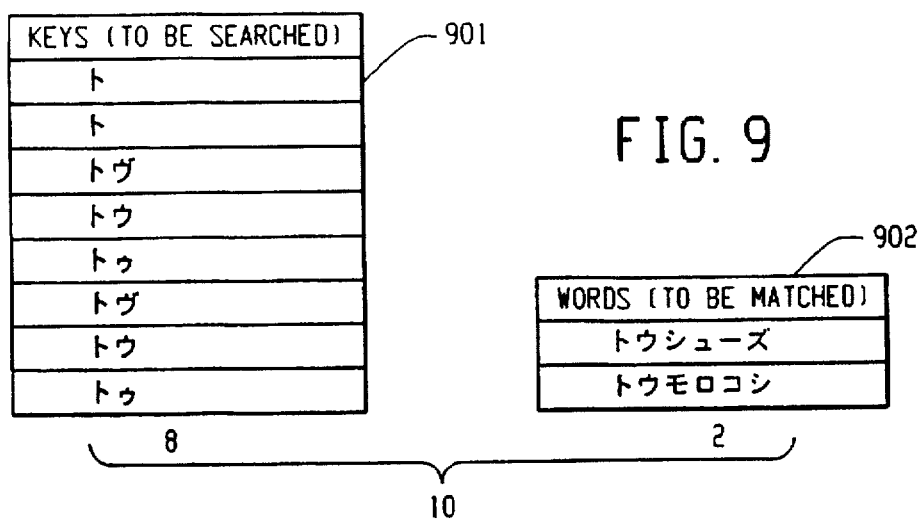

| KEYS (TO BE SEARCHED) |
|---|
| ト |
| ト |
| トヴ |
| トウ |
| トゥ |
| トヴ |
| トウ |
| トゥ |

| WORDS (TO BE MATCHED) |
|---|
| トウシューズ |
| トウモロコシ |

FIG. 10

| HEADER | PART OF SPEECH |
|---|---|
| ⋮ | ⋮ |
| 分から | IRREALIS FORM 1 OF GODAN-RAGYO VERB |
| 分かり | ADVERB FORM 1 OF GODAN-RAGYO VERB |
| 分かっ | ADVERB FORM 2 OF GODAN-RAGYO VERB |
| 分かる | ATTRIBUTIVE FORM OF GODAN-RAGYO VERB |
| 分かる | CONCLUSIVE FORM OF GODAN-RAGYO VERB |
| 分かれ | HYPOTHETICAL FORM OF GODAN-RAGYO VERB |
| 分かれ | IMPERATIVE FORM OF GODAN-RAGYO VERB |
| ⋮ | ⋮ |
| なく | ADVERB FORM 1 OF AUXILIARY VERB FOR NEGATION |
| なかっ | ADVERB FORM 2 OF AUXILIARY VERB FOR NEGATION |
| ない | ATTRIBUTIVE FORM OF AUXILIARY VERB FOR NEGATION |
| ない | CONCLUSIVE FORM OF AUXILIARY VERB FOR NEGATION |
| なけれ | HYPOTHETICAL FORM OF AUXILIARY VERB FOR NEGATION |
| た | AUXILIARY VERB FOR THE PAST |
| ⋮ | ⋮ |
| て | CONJUNCTIVE PARTICLE (ATTRIBUTIVE FORM) |
| ば | PARTICLE (HYPOTHETICAL FORM) |
| ⋮ | ⋮ |

| HEADER | PART OF SPEECH |
|---|---|
| ⋮ | ⋮ |
| 分か | STEM OF GODAN-RAGYO VERB |
| ⋮ | ⋮ |
| ら | INFLECTIONAL ENDING 1 OF IRREALIS FORM OF GODAN-RAGYO VERB |
| り | INFLECTIONAL ENDING 1 OF ADVERB FORM OF GODAN-RAGYO VERB |
| る | INFLECTIONAL ENDING OF ATTRIBUTIVE FORM OF GODAN-RAGYO VERB |
| る | INFLECTIONAL ENDING OF CONCLUSIVE FORM OF GODAN-RAGYO VERB |
| れ | INFLECTIONAL ENDING OF HYPOTHETICAL FORM OF GODAN-RAGYO VERB |
| れ | INFLECTIONAL ENDING OF IMPERATIVE OF GODAN-RAGYO VERB |
| ろ | INFLECTIONAL ENDING 2 OF IRREALIS FORM OF GODAN-RAGYO VERB |
| ⋮ | ⋮ |
| なく | ADVERB FORM 1 OF AUXILIARY VERB FOR NEGATIVE |
| なかっ | ADVERB FORM 2 OF AUXILIARY VERB FOR NEGATIVE |
| ない | ATTRIBUTIVE FORM OF AUXILIARY VERB FOR NEGATIVE |
| ない | CONCLUSIVE FORM OF AUXILIARY VERB FOR NEGATIVE |
| なけれ | HYPOTHETICAL FORM OF AUXILIARY VERB FOR NEGATIVE |
| た | AUXILIARY VERB FOR PAST |
| ⋮ | ⋮ |
| て | CONJUNCTIVE PARTICLE (ADVERB FORM) |
| ば | PARTICLE (HYPOTHETICAL FORM) |
| ⋮ | ⋮ |

FIG. 11

| HEADER | PART OF SPEECH |
|---|---|
| ... | ... |
| あか | STEM OF GODAN-RAGYO VERB |
| ... | ... |
| らな | STEM OF ' ' - ATTACHED AUXILIARY VERB FOR NEGATIVE |
| ... | ... |
| い | CONCLUSIVE OR ATTRIBUTIVE FORM OF ADJECTIVE TYPE INFLECTIONAL ENDING |
| かった | INFLECTIONAL ENDING OF ADJECTIVE TYPE PAST +'た' |
| ければ | INFLECTIONAL ENDING OF ADJECTIVE TYPE HYPOTHETICAL FORM +'ば' |
| く | ADVERB FORM OF ADJECTIVE TYPE INFLECTIONAL ENDING |
| ... | ... |
| って | 'つ'- ATTACHED CONJUNCTIVE FORM (ADVERB FORM) |
| れば | 'れ'- ATTACHED PARTICLE (HYPOTHETICAL FORM) |
| ... | ... |

FIG. 12

| HEADER | PART OF SPEECH (DESCRIPTION) |
|---|---|
| ... | ... |
| 分か | STEM OF GODAN-RAGYO VERB |
| ... | ... |
| らな | STEM OF 'ら' - ATTACHED AUXILIARY VERB FOR NEGATION |
| ... | ... |
| らざるを得 (1401) | 'ら'+'~ CANNOT BE HELPED' |
| い (1402) | CONCLUSIVE OR ATTRIBUTE FORM OF ADJECTIVE TYPE INFLECTIONAL ENDING |
| い. (1403) | CONCLUSIVE FORM OF ADJECTIVE TYPE INFLECTIONAL ENDING + PERIOD |
| いであろう (1404) | CONCLUSIVE FORM OF ADJECTIVE TYPE INFLECTIONAL ENDING + 'で'+'あろう' |
| く | ADVERB FORM OF ADJECTIVE TYPE INFLECTIONAL ENDING |
| くな | ADVERB FORM OF ADJECTIVE TYPE INFLECTIONAL ENDING + STEM OF 'な' |
| くな | ADVERB FORM OF ADJECTIVE TYPE INFLECTIONAL ENDING + STEM OF AUXILIARY VERB FOR NEGATIVE |
| ... | ... |
| つ | 'つ' - ATTACHED CONJUNCTIVE PARTICLE (ADVERB FORM) |
| つて (1405) | 'つ' - ATTACHED CONJUNCTIVE PARTICLE (ADVERB FORM) + COMMA |
| ... | ... |

FIG. 14

|  | FIRST CANDIDATE | CONFIDENCE RATIO | SECOND CANDIDATE | CONFIDENCE RATIO | N-TH CANDIDATE | CONFIDENCE RATIO |
|---|---|---|---|---|---|---|
| FIRST CHARACTER POSITION | 도 | 194 | 드 | 190 | 도 | 185 |
| SECOND CHARACTER POSITION | 시 | 204 | 서 | 202 | 사 | 200 |
| THIRD CHARACTER POSITION | 관 | 208 | 권 | 171 | 긴 | 166 |
| FOURTH CHARACTER POSITION | 에 | 229 | 애 | 220 | 에 | 219 |
| FIFTH CHARACTER POSITION |  |  |  |  |  |  |
| SIXTH CHARACTER POSITION | 가 | 206 | 갈 | 203 | 간 | 190 |
| SEVENTH CHARACTER POSITION | 다 | 175 | 디 | 174 | 나 | 155 |

| | First Character Position | Second Character Position | Third Character Position | Fourth Character Position | Fifth Character Position | Sixth Character Position |
|---|---|---|---|---|---|---|
| First Candidate | 車 | 作 | か | 良 | い | 。 |
| Confidence Ratio | 225 | 125 | 208 | 229 | 181 | 215 |
| Second Candidate | 単 | 休 | が | 長 | い | . |
| Confidence Ratio | 215 | 216 | 198 | 171 | 171 | 204 |
| Third Candidate | 卓 | 体 | カ | 皮 | | |
| Confidence Ratio | 210 | 115 | 188 | 171 | | 165 |
| Fourth Candidate | | 仁 | 刀 | 斥 | | |
| Confidence Ratio | | 105 | 175 | 170 | | |
| Fifth Candidate | | 拾 | 力 | | | |
| Confidence Ratio | | 95 | 170 | | | |

| CATEGORY OF W1 | CATEGORY OF W2 | m(W1,W2) |
|---|---|---|
| SENTENCE HEAD | NOUN | 1 |
| NOUN | PARTICLE 1 (が、の、を、に、へ、...) | 5 |
| NOUN | PARTICLE 2 (は、も、こそ、さえ、でも、...) | 1 |
| NOUN | PARTICLE 3 (か、な、ぞ、よ、...) | 2 |
| NOUN | NOUN | 3 |
| NOUN | VERB STEM | 5 |
| ... | ... | 5 |
| VERB STEM | VERB STEM | 0 |
| ... | ... | ... |
| CONCLUSIVE FORM OF INFLECTIONAL ENDING | 。 | 0 |
| ... | ... | ... |
| PARTICLE 1 | NOUN | 5 |
| PARTICLE 2 | NOUN | 5 |
| PARTICLE 3 | VERB STEM | 5 |
| PARTICLE 4 | VERB STEM | 5 |
| ... | ... | ... |

FIG. 19

CHARACTER RECOGNITION METHOD AND APPARATUS

This is a continuation of U.S. application Ser. No. 08/357,669, filed Dec. 16, 1994, now abandoned.

BACKGROUND OF THE INVENTION

The present invention relates to a character recognition method provided with means for improving recognition accuracy by using a post-processing operation, and more particularly to the character recognition method and apparatus with post-processing which are suitable for automatically inputting a general document through a character recognition apparatus.

If a document is scanned by an optical character reader (OCR), plural candidate characters (each of which provides a numerical confidence ratio given thereto) are obtained for each character pattern. In this case, normally, the character with the highest confidence ratio does not reach a complete right answer. The right answer may not be contained in the candidate characters. To compensate for incomplete character recognition performance, the post-processing such as modification and supplement is carried out about the scanned result of the general document. This is done by the arrangement shown in FIG. 1. Such post-processing is discussed in the following publications [1], [2], [3] and JP-A-3-125288.

[1] T. Sugimura: "Error Correction Method for Character Recognition Based on Confusion Matrix and Morphological Analysis", Proceedings of Electronic Information and Communication Society, Vol.J72, No.7, pp.993–1000 (1989)

[2] T. Takao et al.: "Implementation and Evaluation of Portion of Post-processing for Japanese Document Reader", Proceedings of Information Processing Society, Vol.30, No.11, pp.1394–1401 (1989) p1 [3] N. Itoh et al.: "A Method of Detecting and Correcting Errors in the Results of Japanese OCR", Proceedings of Information Processing Society, Vol.33, No.5, pp.664–670 (1992)

The summary of the techniques on which the invention is based will be discussed below.

In FIG. 1, a document 101 to be scanned is converted into a digital image through the effect of a scanner 102. The digital image is sent to a character recognition function 103 in which character patterns are segmented and a group of candidate characters is obtained about each character pattern. Each candidate character provides its own confidence ratio. FIG. 2A shows the character patterns and the group of candidate characters about each character pattern obtained from an example of a sentence "米国産のトウモロコシや (corn produced in U.S.)". The confidence ratio is normally represented by a real number ranging from 0 to 1. In this example, however, it is digitized to a positive umber ranging from 0 to 255. Each column represents a group of candidate characters with their confidence ratios for each character pattern. (A right character is enclosed in a circle. In FIG. 2(a) the first two candidate characters for the fifth character position, "ト" and "卜" resemble each other. However, the former "ト" is a Chinese character or kanji character and the latter is a Japanese katakana character "卜". The same can be said with reference to the Figures described hereinafter. FIG. 15 shows the example of the Korean Language, in which a right character is enclosed in a circle like that of FIG. 2A (The right string means "(I) go to a library". In the Korean language, "to the library" is separated from "go" with a blank indicated in a fifth column).

Turning to FIG. 1, the output of the character recognition function 103 is sent to a character recognition post-processing function 104 in which the output is modified and supplemented. The character recognition post-processing function 103 consists of three parts, that is, a candidate character modification function 1044, a candidate word extraction function 1045, and a candidate word sequence extraction function 1046. The candidate character modification function 1044 is made up of a candidate character restriction function 10441 and a candidate character supplement function 10442. The candidate character restriction function 10441 operates to exclude the characters provided with the lower confidence ratios than the predetermined value from the group of candidate characters. The candidate character supplement function 10442 operates to add a specific character to the candidate character by using a confusion matrix (meaning an erroneous recognition probability table) 1041 if necessary.

FIG. 2B shows one example of the group of candidate characters as shown in FIG. 2A about which the candidate character restriction function is carried out. Through the effect of the candidate character modification function 1044, a group of candidate characters per one character pattern is obtained. The group of candidate characters is sent to the candidate extraction function 1045 in which a word extraction and a matching cost calculation are carried out about each candidate word. The word extraction function 10451 is executed to extract a word which may appear in the input sentence by using keys generated from the group of candidate characters and a dictionary 1042. The matching cost calculation function 10452 is executed to calculate a matching cost which is an index to the adaptability of the candidate word to the character pattern, generate a set of {candidate word, position, matching cost} (referred to as a candidate word lattice) and then to send the candidate word lattice to a candidate word sequence extraction function 1046.

FIG. 3 shows a model of the candidate word lattice outputted from the candidate word extraction function 1045 by using the candidate character set shown in FIG. 2A. FIG. 16 shows a model of a candidate word lattice outputted from the candidate word extraction function 1045 by using the candidate character set shown in FIG. 15. In FIG. 15, $c_1$, $c_2$ ... denote a matching cost of each candidate word, which may be calculated by various proposed methods. For example, the method disclosed at page 20, lines 13–26 of the present application may be used. The candidate word lattice is sent to the candidate word sequence extraction function 1046, in which the most feasible word sequence is extracted through the effect of a word connectability checking function 10461 and the most feasible word sequence extraction function 10462. This extraction is executed by using the grammatical knowledge 1043 including a connectability check of each word in light of a part of speech, a word frequency, and a connection cost between two words. The most feasible word sequence is displayed on a terminal 105.

The present invention does not specify the method for realizing the candidate character modification function 1044. Hence, the conventional method about the word extraction function 10451 and the dictionary 1042 will be discussed in detail.

Word Extraction Method

Word extraction methods are divided broadly into two types. One type is a method exemplarily shown in FIG. 4, which method will be referred to as "candidate-character-driven word extraction (CCDE)". This method uses only candidate characters at a higher confidence ratio than a given value (in FIG. 4, to make the description simple, "the difference d of the confidence ratio between the candidate character having the highest confidence and the other candidate characters is 60 or less". As another restriction, "the order is within the K rank" can be considered.), combines those candidate characters in a manner to keep the sequence shorter than a constant length K, and searches a word dictionary using the combination as a key.

Turning to FIG. 4, the "candidate-character-driven word extraction (CCDE)" is applied to the portion corresponding to the fifth or subsequent characters of the example shown in FIG. 2. The object to be searched is a group of keys shown in FIG. 5, which includes the right character sequence "トウモロコシ (corn)". (Herein, K-5 is given for making the description simple).

The other method will be referred to as "dictionary-driven word extraction". FIG. 6 exemplarily shows this method. The dictionary is arranged to access each word on the basis of a key character at a specific position. To extract the candidate word with the m-th character as its head, the group of words, with the first character having the highest confidence among candidate characters for m-th character, is extracted from the dictionary. The extracted group of words is assumed as a group of words to be matched. Then, the matching costs between the group of candidate characters and those words are calculated for generating the candidate word lattice.

FIG. 7 shows the group of words to be matched if the head character is used as a key in the example of FIG. 6.

Dictionary

As a data structure and a searching method used for searching the dictionary, there have been proposed various standard methods such as a TRIE structure and hashing for speeding up the search. The present invention is not restricted by those methods but allows any method to be used with a well-known method. Hence, the description thereabout is left out. The present invention is arranged to design a header word for speeding up the post-processing. In particular, this invention is characterized in treating a verb inflected form. As such, the conventional method for processing a verb inflected form will be described below.

In the conventional method, a dictionary header used for verb inflection analyses are divided roughly into two types, one of which is referred to as "inflected forms expansion method (IFE)". In the "inflected forms expansion method", the verb inflection is used as an entry in the form of expanding the inflection as shown in FIG. 10. Each entry has a categorical code given thereto. The connectivity of the words is represented by an incident matrix which represents the connectivity of the categorical codes by 1 or 0. Herein, the detailed description about the categorical code and the incident matrix will be left out. The other type will be referred to as an "inflectional endings separation method (IES)". In the "inflectional endings separation method", as shown in FIG. 11, the verb inflection is separated into a stem and an inflectional ending. Auxiliary verbs and a few irregular verbs are expanded as normal inflected forms when they are registered in the dictionary.

In turn, the description will be oriented to the matching cost calculation function 10452 and the candidate word sequence extraction function 1046. As an example, by using the candidate character set obtained by a character recognition of a string which means "車体 がよい (a car body is excellent)", erroneous recognition of characters is corrected. FIG. 18 shows a candidate word lattice generated in accordance with a set of candidate characters shown in FIG. 17.

A word sequence w1, . . . , wn, which is obtained by combining the words in the candidate word lattice in a manner to cover the sentence from the head to the end without overlapping, in general, has a matching cost $g(w1, \ldots, wn)$ and an estimated value as a word sequence (referred to as a linguistic cost) $f(w1, \ldots, wn)$.

$$g(w_1 \ldots w_n) = \sum_{i=1}^{n} c(W_i) \quad \text{[Expression 1]}$$

wherein g is defined as a sum of word matching cost c(wi) of each word. The word matching cost c(w) of w=C1C2 ... Cm is represented as a sum of character matching costs of characters composing the word. Setting the group of candidate characters to be matched to Ci to Si ={(Ci1, Vi1), . . . , (Ci1, Vi1), . . . , (CiN), ViN)}, c(w) is defined by expression 2.

$$c(C_1 \ldots c_m) = \sum_{i=1}^{m} K(C_i, S_i) \quad \text{[Expression 2]}$$

wherein the matching cost between Ci and Si is K(Ci, Si).

The method shown in FIG. 18 is arranged so that (m−1) is given as a matching cost to a character recognized as the m-th one and the matching cost g(w) of a word w is a sum of matching costs of the characters composing the word. Later, this method will be referred to as an order accumulating method (OAM) for the explanation's convenience.

On the other hand, f is defined by using a function m shown in FIG. 19 as indicated in expression 3.

$$f(w_1 \ldots w_n) = m(@, w_1) + \sum_{i=1}^{n-1} m(W_i, W_{i+1}) \quad \text{[Expression 3]}$$

wherein @ is a symbol for representing a sentence head virtually used for calculating the linguistic cost.

To totally estimate the two types of costs, the cost function F is defined in the form of αg+f with a proper positive number α. The proper value of α is obtained by the experiment. In the examples shown in FIGS. 17 and 18, the following two word sequences have the lowest linguistic cost (the sentence head is left out).

A1=( 車体 ( noun)/( が particle 1)/( 良 verb stem)/ ( い conclusive form ending)/(o, period)

A2=( 単作 noun)/( が particle 1)/( 良 verb stem)/ ( い conclusive form ending)/(o, period) where "単作" means single crop.

The linguistic cost is f(A1)=f(A2)=7, while the matching cost is g(A1) 4 and g(A2)=3.

On the other hand, the following word sequence has the lowest matching cost.

A3=( 単作 noun)/( か particle 3)/( 良 verb stem)/ ( い conclusive form ending)/(o, period)

Hence, in this case, setting α=0.5, based on equations of F=0.5*f+g, F(A1)=9, F(A2)=8.5 and F(A3)=10, and the minimum cost solution is A2. Hence, the output character sequence is "単作が良い".

That is, the third character " か " and the fifth character " い " are replaced with the proper characters and " が " and " い " through the the post-processing effect. In this case, however, the first character " 車 is erroneously replaced with " 単 ".

Herein, as the word matching cost, the cost of the character recognized at the m-th one is set as (the confidence ratio of the first character—the confidence ratio of the m-th character) and the matching cost g(w) of a word w as the sum of the matching costs of the characters composing the word. This method will be referred to as a confidence ratio difference accumulating method (CDAM) for the explanation's convenience. With this method, the matching cost is g(A1)=30, g(A2)=30, g(A2)=10. If α=0.05, based on expression of F=0.05 * f+g, F(A1)=8.5, F(A2)=8.5 and F(A3)=9.5. This method reflects a confidence ratio difference more efficiently than the order accumulating method, so that it is assumed as a more accurate cost function. The actual right solution, that is, A1 is contained in the minimum cost solution. However, as the minimum cost solution, two solutions (A1 and A2) are given. The solution to be outputted is not determined. If A2 is outputted, the erroneous replacement takes place like the above-described case. This cannot be eliminated by adjusting the α value.

SUMMARY OF THE INVENTION

Word Extraction

The present invention employs a method arranged to combine the "candidate-character-driven word extraction" with the dictionary-driven word extraction, which method will be referred to as a "hybrid method." The "hybrid method" employs a dictionary in which a word can be accessed by using its heading L-characters. This can be easily realized by using the TRIE structure.

Verb Inflection Analysis

The present invention employs a dictionary having headers as shown in FIG. 12 for the inflection analysis. That is, the header uses a character sequence composed of an inflectional ending of a verb and a stem of auxiliary verb, a particle, a comma or the like connected to the tail of the inflectional ending.

Matching Cost Calculation

The present invention utilizes an idea that the difference of a confidence ratio given in the case of a totally higher confidence ratio of candidate characters is more important that the difference of a confidence ratio given in the case of a totally lower confidence ratio of candidate characters. To implement it, the character matching cost is calculated as below. That is, in the calculation of the character matching cost of each of the characters composing a word, setting the character as C and a group S of candidate characters to be matched to the character C as S={(C1, V1, . . . , (Ci, Vi), . . . , (CN, VN)}, where Ci is the i-th candidate character and Vi is its confidence ratio, the total cost of C and S is calculated by using a positive valved function K(C, S) having the property that is operated to decrease as (V0−V1) is made larger and increase as (V1−Vi) is made larger. For example, the function K(C, S) can be used as follows; K(C, S)=α(G1(V0, Vi, Si) if C=Ci, and K(C, S)=G2 (VN) if no i is given for satisfying C=Ci, where G1 is operated to decrease as (V0−V1) is made larger, and increase as V1−Vi is made larger.

Word Extraction

The description will be oriented to the shortcomings of the conventional method about the word extraction, the verb inflection analysis, and the matching cost calculation.

The candidate-character-driven word extraction (CCDE) has a problem that the increase of d or L leads to exponential increase of the number of keys to be searched. This puts a great burden on the word extraction and the post processing. In the example shown in FIG. 4, as shown in FIG. 5, the number of keys to be searched is as many as 750 though L≦5, which is too small in light of the actual application.

The dictionary-driven word extraction (DDE) does not bring about combinatorial explosion of a key number. However, the number of words whose first character matches to a given character exceeds 100 on the average if the dictionary contains about 100,000 words (see the above-described publication [2]). This also puts a great burden on the computer.

Verb Inflection Analysis

"Verb Inflection Analysis"

In the verb inflection analysis", the number of dictionary entries is made greater by ten thousands words than that given in the case of only the verb stem. When using the "dictionary-driven word extraction", for example, each time a Chinese character like " 分 " appears, the matching cost of all the inflections is required to be calculated.

In the "inflectional endings separation method (IES)", the increase of separations puts a greater burden on the check for connectivity.

The time consumed in searching the dictionary and checking for the connectivity occupies a large mount, 75%, of post-processing. Hence, to improve the speed of the post-processing for character recognition if a large amount of document is treated, it is necessary to solve the above-described problems. That is, the problems to be solved by the invention are;

1) improving the efficiency of searching the dictionary and extracting the candidate word, and 2) improving the efficiency of searching the dictionary and checking for the connectivity by means of rationalizing the inflection.

Matching Cost Calculation

"Matching Cost Calculation"

As mentioned above, there are two types of word matching cost calculations as the conventional method. In the order accumulating method (OAM), a pair of candidate characters whose orders differ by one but confidences are close to each other and a pair of candidate characters whose orders differ by one but their confidences are far away from each other, are treated as pairs having a difference of a cost 1. The confidence ratio difference accumulating method (CDAM) also has a problem though it can reflect the difference of a confidence ratio between the candidate characters. That is, if the confidence ratio is generally low as the second character shown in FIG. 17, the difference of the confidence ratio is negligible. If, on the other hand, the confidence ratio is generally high as the first character, the difference of the confidence ratio is more significant than the former case. By the confidence ratio accumulating method, this difference can not be represented. As a result, the most feasible solution can not be identified by this cost calculation.

BRIEF DESCRIPTION OF THE DRAWINGS

FIG. 2A is a view showing a set of candidate characters given (before the candidate character restriction);

FIG. 2B is a view showing a set of candidate characters given (after the candidate character restriction);

FIG. 5 is a view showing keys generated by the "candidate-character-driven word extraction";

FIG. 7 is a view showing candidate words extracted by the "dictionary-driven word extraction";

FIG. 9 is a view showing keys and candidate words generated by the "hybrid method";

FIG. 10 is a table showing dictionary entries used for verb inflection analysis in the case of using the conventional system ("inflected forms expansion method");

FIG. 11 is a table showing dictionary entries used for verb inflection analysis in the case of the conventional system ("inflectional endings separation method");

FIG. 12 is a table showing dictionary entries used for verb inflection analysis proposed by the present application;

FIG. 14 is a table showing a transformation of dictionary entries shown in FIG. 12;

FIG. 15 is a view showing a set of candidate characters given in the case of recognizing a Korean sentence (before the candidate character restriction);

FIG. 17 is a view showing a set of candidate characters (after the candidate character restriction);

FIG. 19 is a table showing a function for providing a linguistic cost; and

DESCRIPTION OF THE PREFERRED EMBODIMENT

Figure 20:
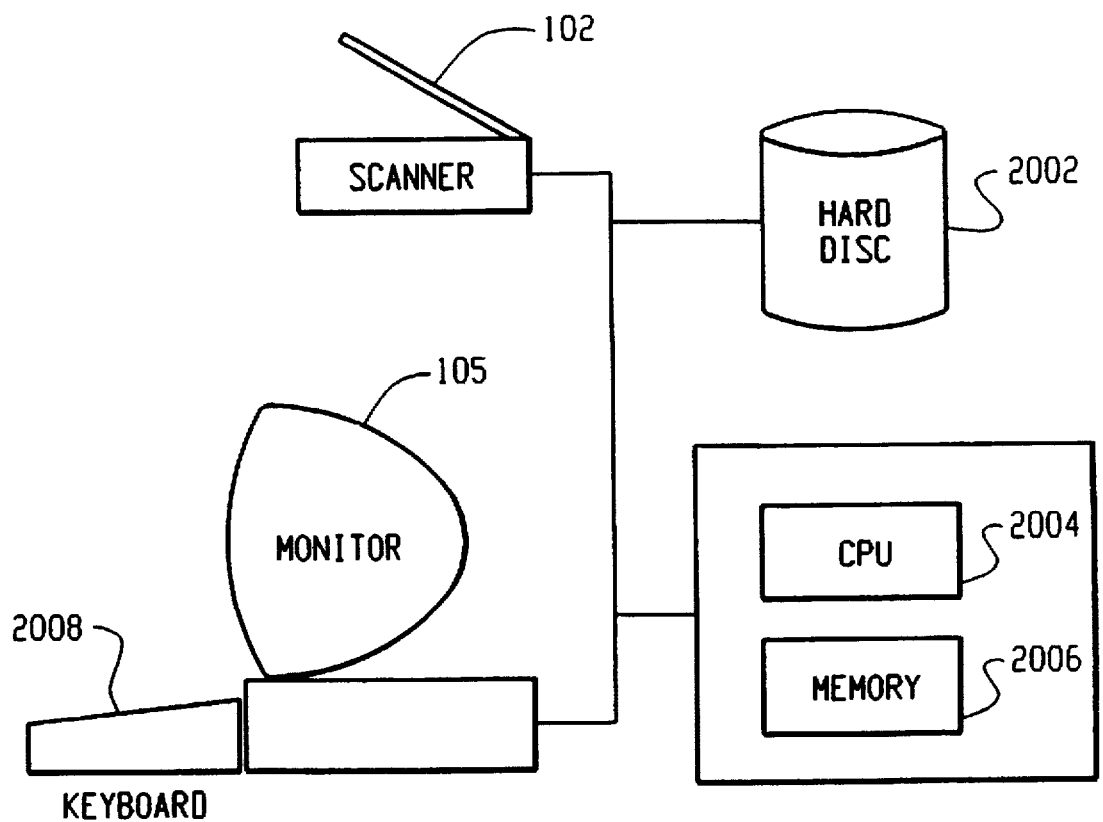
FIG. 20 is a perspective view of an optical character reading system.

FIG. 20 is a perspective view of an optical character reading system. Scanner 102 scans document 101. A CPU 2002 stores data produced by the scanner 102 to a hard disk 2002. Data required for character recognition processing is also stored in a memory 2004. Commands are entered to the CPU 2002 through a keyboard 2008. Candidate characters and characters produced during the character recognition process are viewed on a display 105.

Word Extraction

In the "hybrid method", if L=2 is set, the number of keys whose length is equal to or shorter than 2 is reduced by a factor of several tens if those keys are generated by the "candidate-character-driven word extraction". Most of the words in the normal Japanese dictionary have a length equal to or smaller than 2. By putting the restriction about the head L characters, the number of candidate words (whose length is 3 or more) obtained by the "dictionary-driven word extraction" is made lower to an average number. The "hybrid method", therefore, makes it possible to greatly reduce the burdensome of searching the dictionary and extracting a candidate word in comparison with the solely used conventional method.

This effect will be concretely discussed with the same method as the conventional method. As shown in FIG. 9, the times of searching the dictionary by means of the "hybrid method" are equal to the number of to-be-searched keys whose length is equal to or less than 2, that is, 8, the number of candidate words obtained by the "dictionary-driven word extraction" is 2, the total of both is ten. Hence, the "hybrid" method makes it possible to greatly reduce the troublesome operation of extracting a word from the dictionary ($1/10$ to $1/100$).

Verb Inflection Analysis

"Verb Inflection Analysis"

Further, the use of the entry for the verb inflection analysis proposed by the present invention makes it possible to eliminate the necessity of one of connectability checks for the verb stem and its inflectional ending and for the inflectional ending and the relevant auxiliary verb (or particle), thereby improving the post-processing efficiency. The addition of the inflectional ending provides only about 150 entries, which are negligible in light of the dictionary scale.

Matching Cost Calculation

For example, setting $\beta=1$, $G1(V0, V1, Vi)=\{Max\{(V1-Vsh), 0\}\}(V1-Vi)/(V0-Vsh)$, and $Vsh=90$, $V0=255$ at the aforementioned function K, for the word sequences A1 and A2 described with respect to the prior art, $g(A1)=20.8$ and $g(A2)=14.8$ are given. The solution which gives the minimum cost is as follows.

A4=( 車体 noun)/( か particle 3)/( 良 verb stem)/ ( い inflectional ending)/(o, period)

wherein $g(A4)=7.6$. Setting $\alpha=0.1$, $F(A1)=F(A2)=9.1$ and $F(A3)=9.8$. Therefore, the minimum cost solution of F is made to be only A1. As a result, all the recognition errors are allowed to be correctly replaced.

Word Extraction

Hereafter, with reference to FIG. 8, the procedure for extracting a candidate word according to the "hybrid method" will be discussed with an example of a procedure for extracting a candidate word located after the fifth character shown in FIG. 2. In addition, the character pattern sequence is assumed to be sufficiently long.

In step 801, a character head position p is set to 5.

In step 802, the upper limit of a length of a key generated by the "candidate-character-driven word extraction" is set to L, where L=2. To exclude the candidate character with a low confidence ratio for enhancing the processing speed, at a step 803, restriction is put on the candidate characters used for generating the key, where d=60.

In steps 8041 and 8042, the operation is executed to set the upper limits of the matching costs C1 and C2 for determining whether or not the candidate word obtained by the dictionary-driven word extraction" is registered in the candidate word lattice. This restriction is executed to exclude the less feasible candidate word at an early stage for enhancing the post-processing efficiency. In the present description, the matching cost calculation is not discussed in more detail. To make the description simple, herein, the calculation is operated as a sum of "appearance orders of the characters of a candidate word in the set of candidate characters −1". If no proper character is found in the candidate characters, 10 is used in place of "order −1" (where even the lowest candidate is located at the tenth or higher position.)

In general, if p comes close to an end of a character pattern sequence and the candidate word starting from p exceeds the end of the character pattern to be matched thereto, the matching is stopped. On the assumption of the set of candidate characters shown in FIG. 2, the matching cost of the word "トウモロコシ (corn)" is made to be 1+1+0+0+0=2. A longer word has a higher probability of mixing an recognition error. Hence, the relation of C1<C2 is rational. To make the description simple, herein, C1=1 and C2=2 are given.

In step 805, the operation is executed to initialize the area for listing the characters for the key at each position in the preparation of generating the key for the "candidate-character-driven word extraction".

In step 806, the operation is executed to initialize the area Cands for recording a pair of a candidate word with the position p as its head and the matching cost.

In steps 807 and 808, the operation is executed to select and register in a list LK the candidate characters for generating the key based on the difference of the confidence ratio between each candidate character and the most feasible candidate. In this case, since the character pattern is sufficiently long, p+k is not required to exceed the length of the character pattern about a value of k in the relation of 0≦k≦L−1. In the above example, L0={ト, ト} and L1={ヴ, ウ, ゥ} are given.

In step 809, the operation is executed to generate a set of keys whose length is equal to or less than L by using the list generated at the step 808. In this case, the keys are {ト, ト, トヴ, トウゥ, トウ, トウ, トゥ} as listed in the table 901 of FIG. 9.

In step 810, the operation is executed to search each element v of this set in the dictionary. In this case, no element v is not contained in the dictionary. Hence, Cands remains empty.

In step 811, the operation is executed to search a word whose first two characters coincide with v and whose length is equal to or more than 3, obtain the word to be matched, if the matching cost of the word does not exceed C2, and add a pair of the word and its matching cost in Cands.

In this example, there exist the two words to be matched, that is, {トウシューズウ, トウ, トゥ}. The matching costs of {トウシューズ} and {ウ, トウ, トゥ} are 32 and 2, respectively. Hence, the element to be added in Cands is just (ウ, トウ, トゥ 2).

In general, if p comes close to the end of the character pattern sequence and the length from p to the end exceeds L+1, there exists no "word w whose heading L characters coincide with v and length is equal to or more than L+1". No word is thus registered in the candidate word lattice.

Verb Inflection Analysis

In this case, dictionary basically same as that shown in FIG. 12 is used. The present invention does not specify the methods of dividing the dictionary according to the entry length and of expanding the words in a memory for speeding up the search. Further, it is obvious that these methods are realized by any conventional techniques used in the personal computer. Hence, the description about them is left out. Herein, the description will be oriented to the method for arranging an entry.

About the chain of a verb inflected form and an auxiliary verb or the chain of a verb inflected form and a particle, if the subject verb is a Goadan verb, the verb stem is separated from the verb inflectional ending at each inflected form. Hence, the separated inflectional ending is added to the head of the succeeding auxiliary verb or particle for generating a new entry. This holds true to an adjective or a verbal adjective. A vowel stem verb has no inflectional ending, so that this type of verb is not considered for this procedure. Irregular verbs such as "する (do)" connected to the tail of Sino-Japanese verbal nouns are so few that they are expanded as inflected forms. The auxiliary verb is treated as a form of separating a stem from an inflectional ending. The above-described procedure will be illustrated as below.

"分からなかった"→"分か"+"らな"+"かった"
"赤くなかった"→"赤"+"くな"+"かった"
"簡単だった"→"簡単"+"だった"

As listed in the illustrated examples, "らな", "かった", "くな", "だった", and "した" are registered.

The description about a word identification code or an incident matrix is left out herein.

Figure 1:
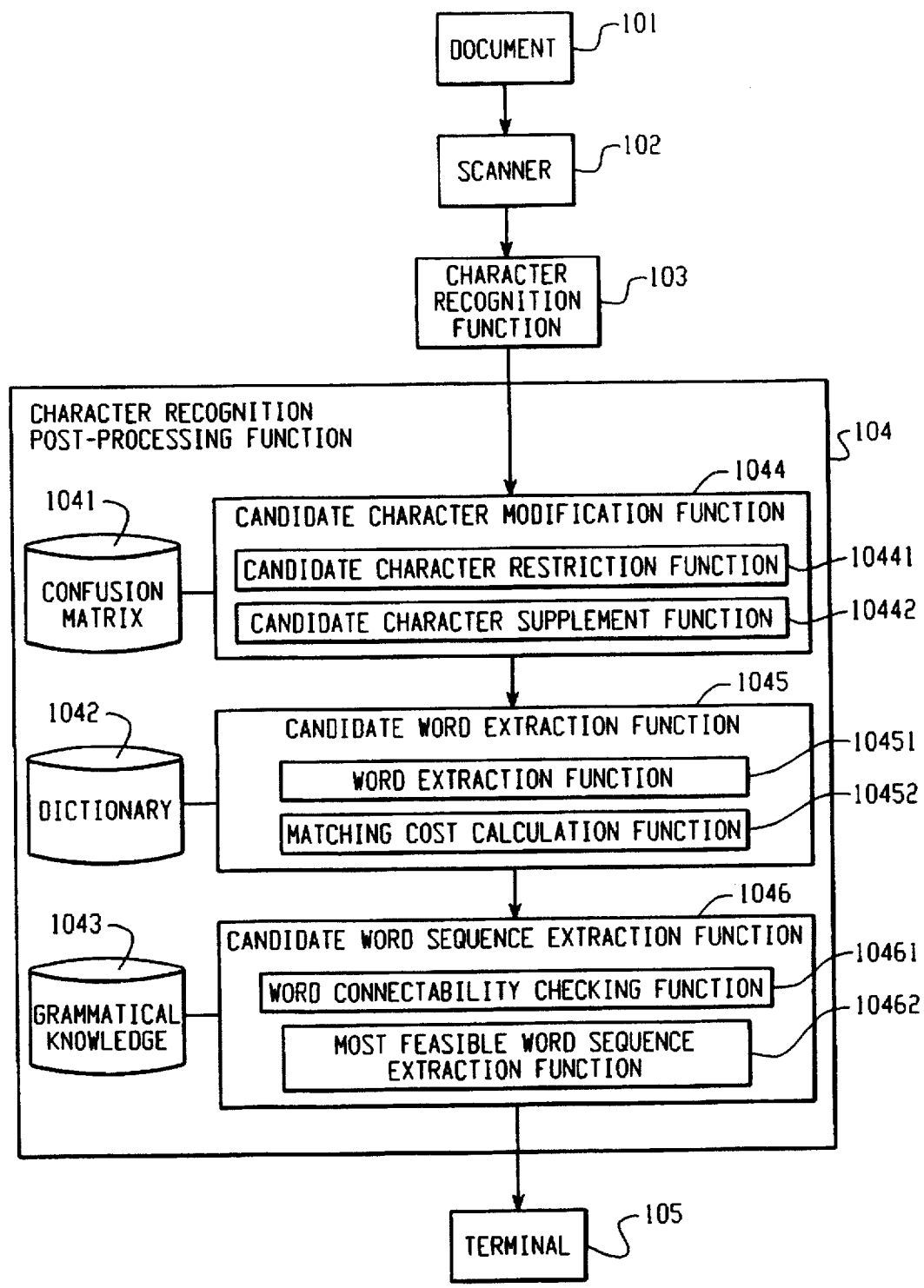
FIG. 1 is an explanatory view showing a summary of a character recognition with post-processing against erroneous recognition.
Figure 3:
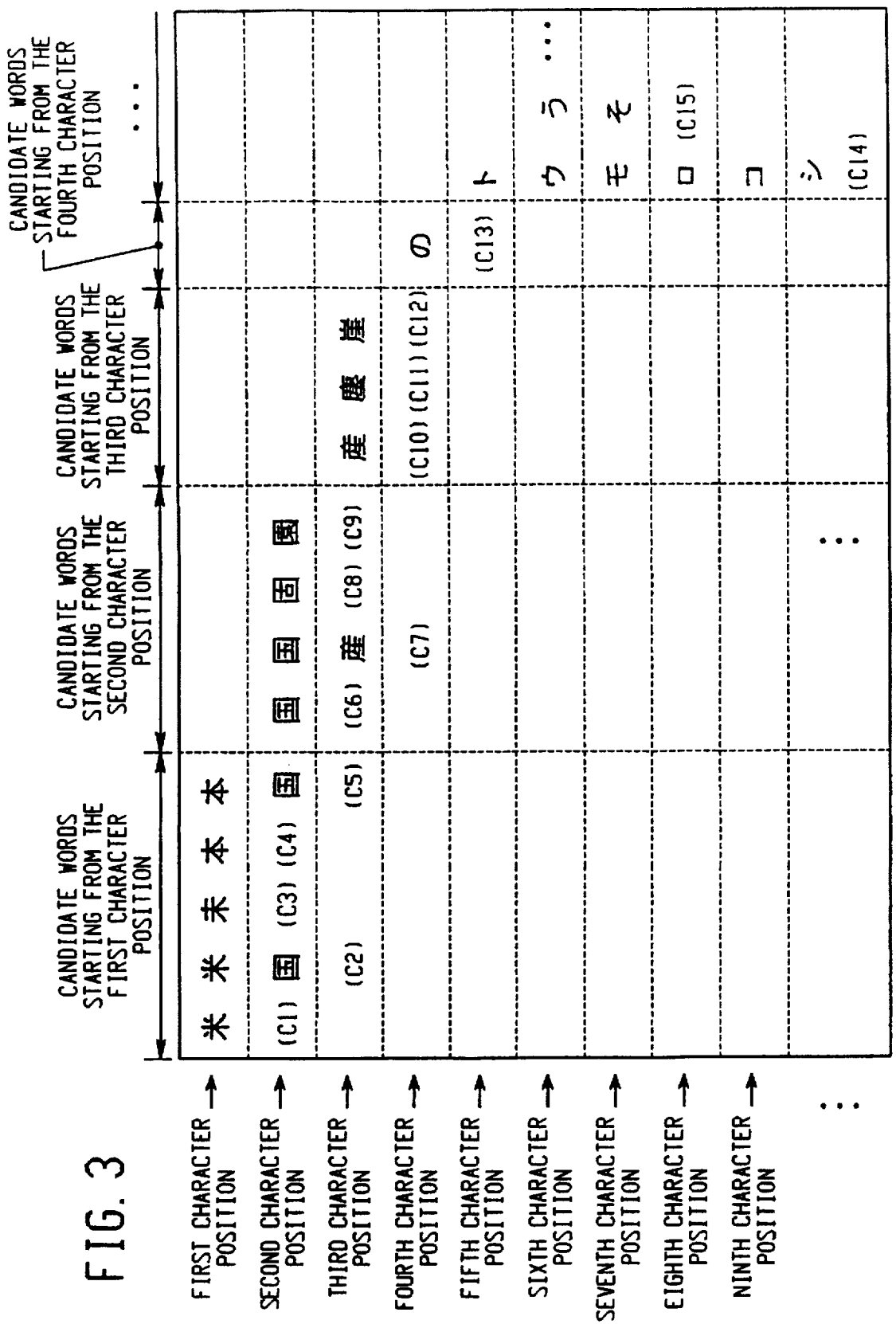
FIG. 3 is a view showing a candidate word lattice generated from the set of candidate characters by using a dictionary.
Figure 4:
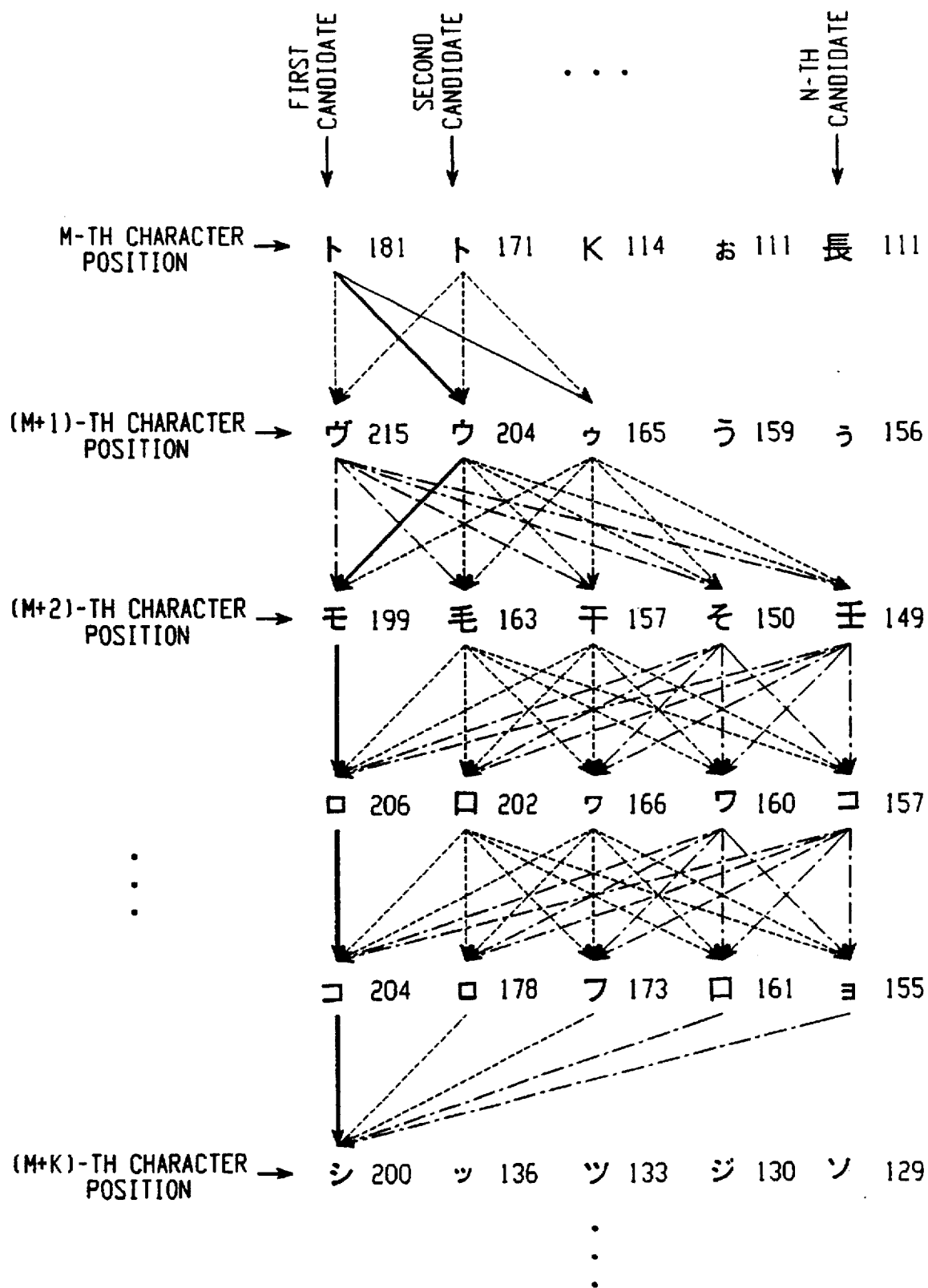
FIG. 4 is an explanatory view showing a conventional system ("candidate-character-driven word extraction") for extracting a candidate word from a group of candidate characters.
Figure 6:
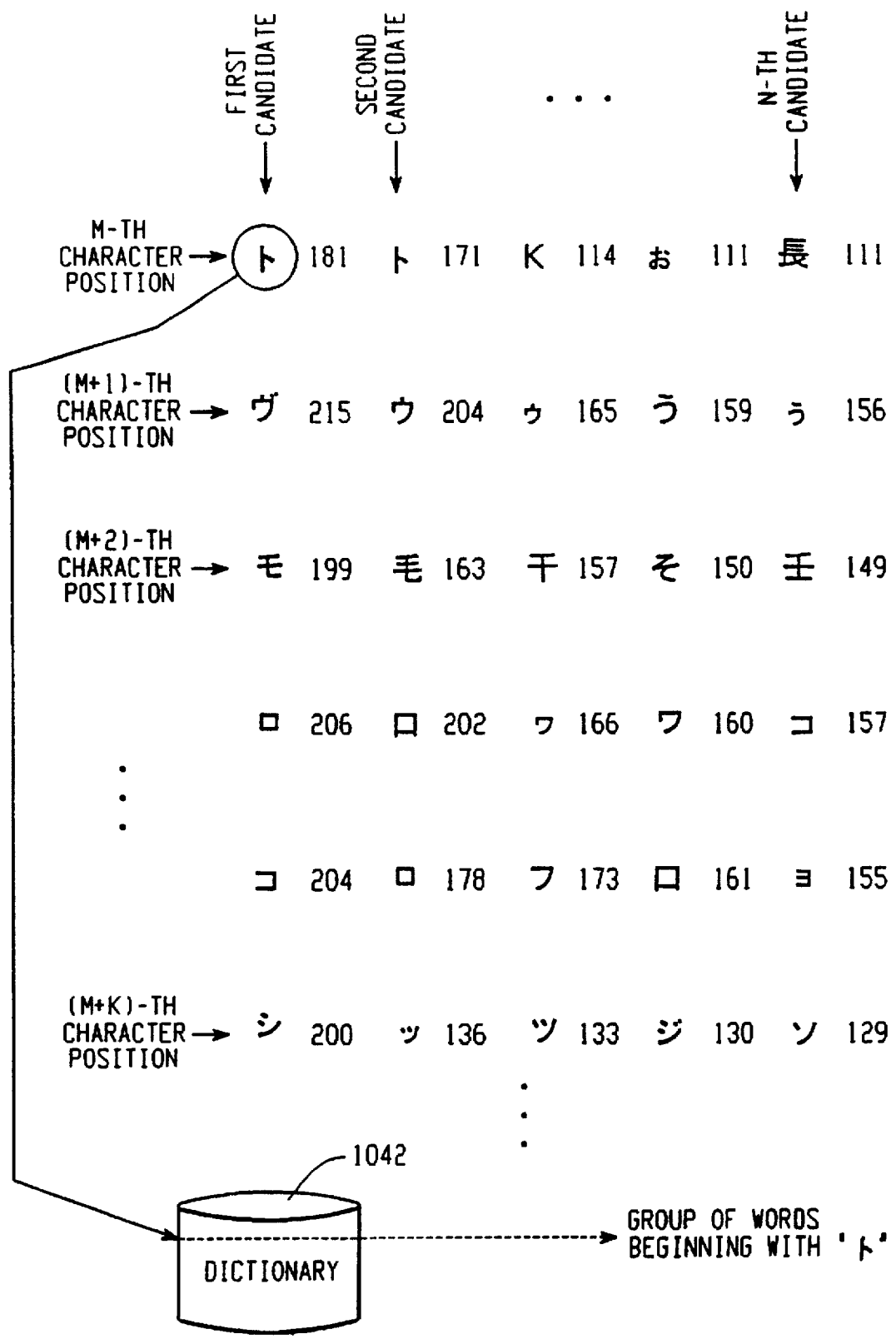
FIG. 6 is an explanatory view showing another conventional system ("dictionary-driven word extraction") for extracting a candidate word from a group of candidate characters.
Figure 8:
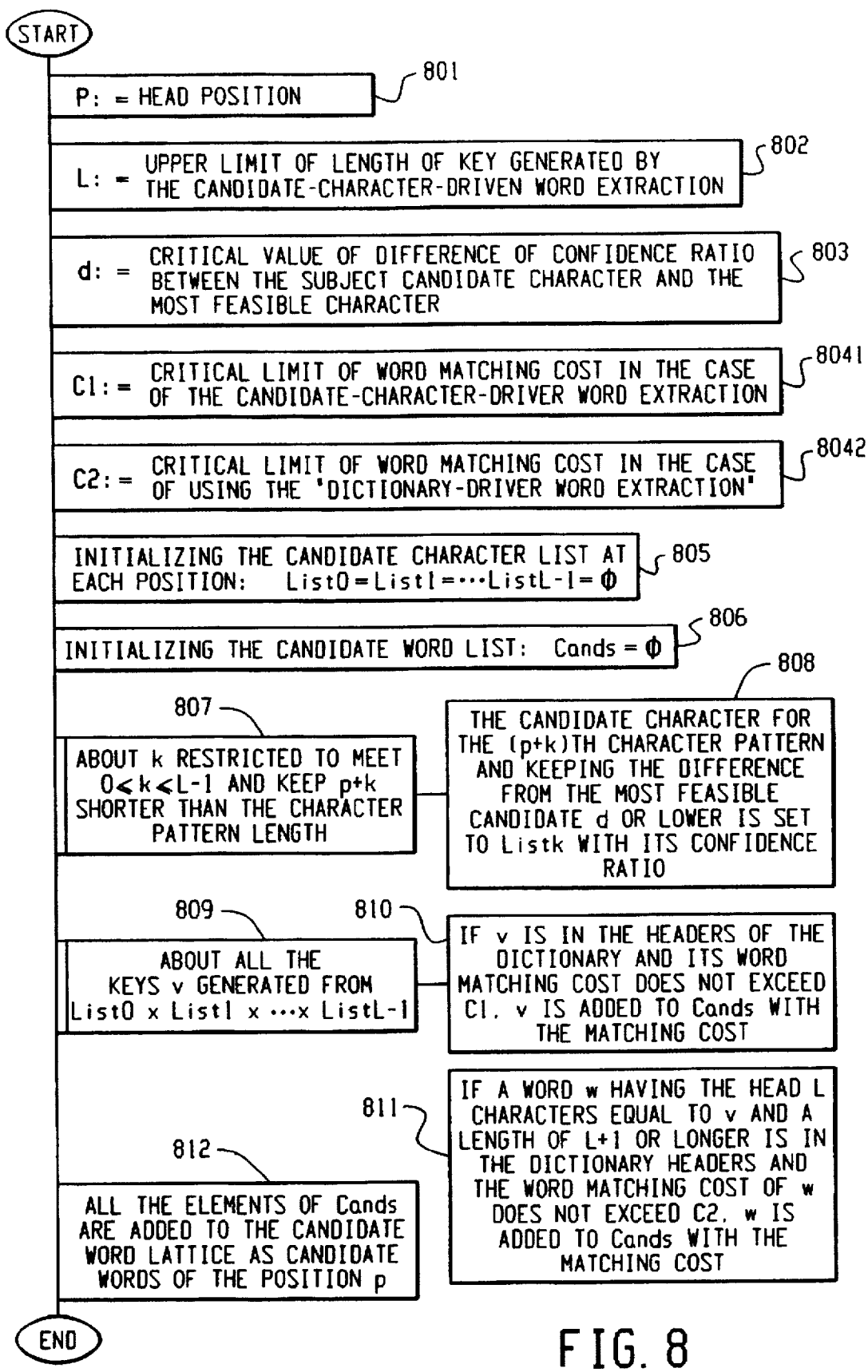
FIG. 8 is a flowchart illustrating a "hybrid method" proposed by the present application.

Another embodiment can be derived from the one shown in FIG. 8, a matching condition of a character sequence is considered to be relaxed. Concretely, if the first L characters are not completely matched to the key having a length L, the character sequence is searched in the dictionary. This procedure is shown in FIG. 13.

Figure 13:
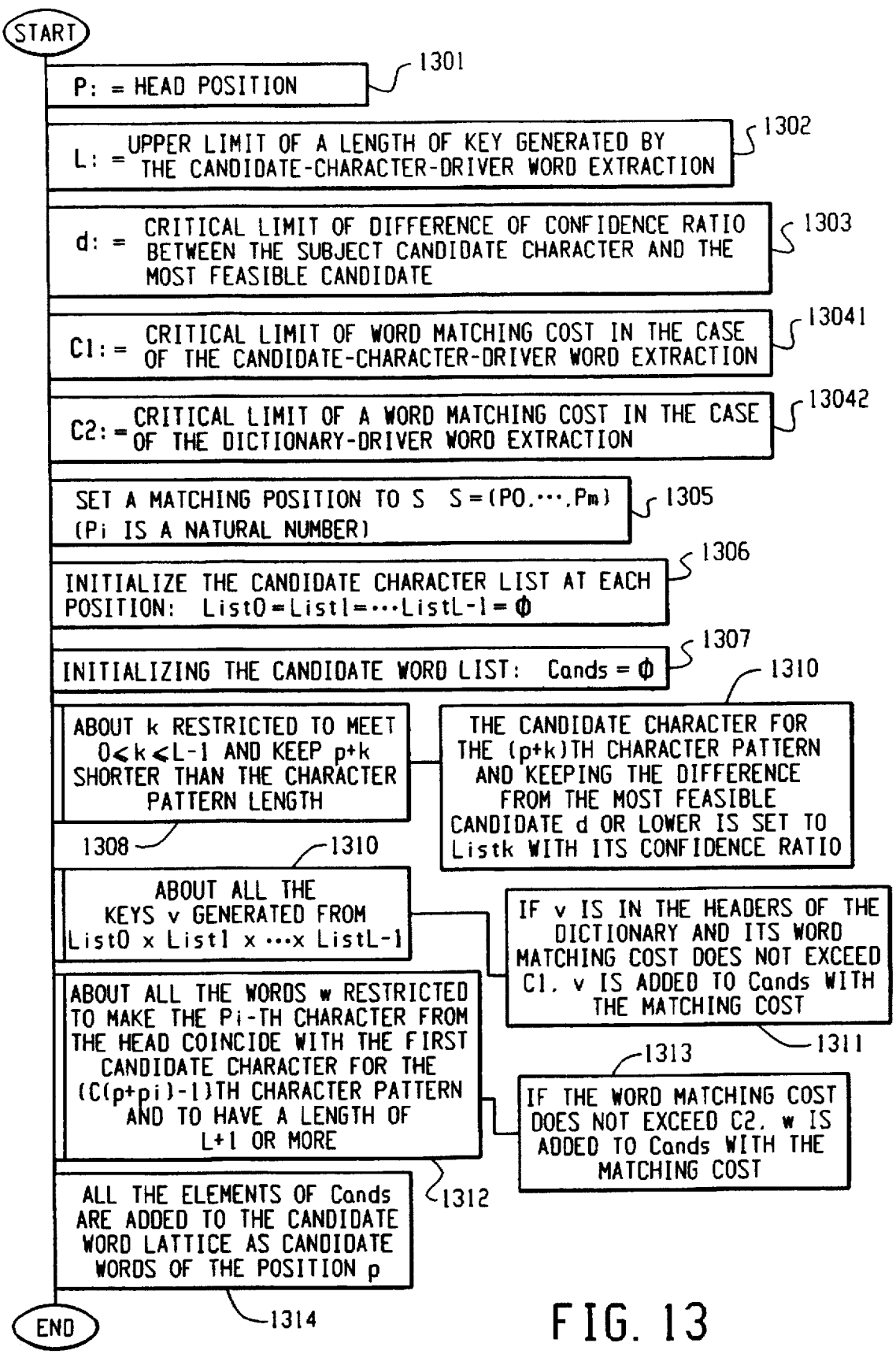
FIG. 13 is a flowchart illustrating a transformation of the "hybrid method" shown in FIG. 8.
Figure 16:
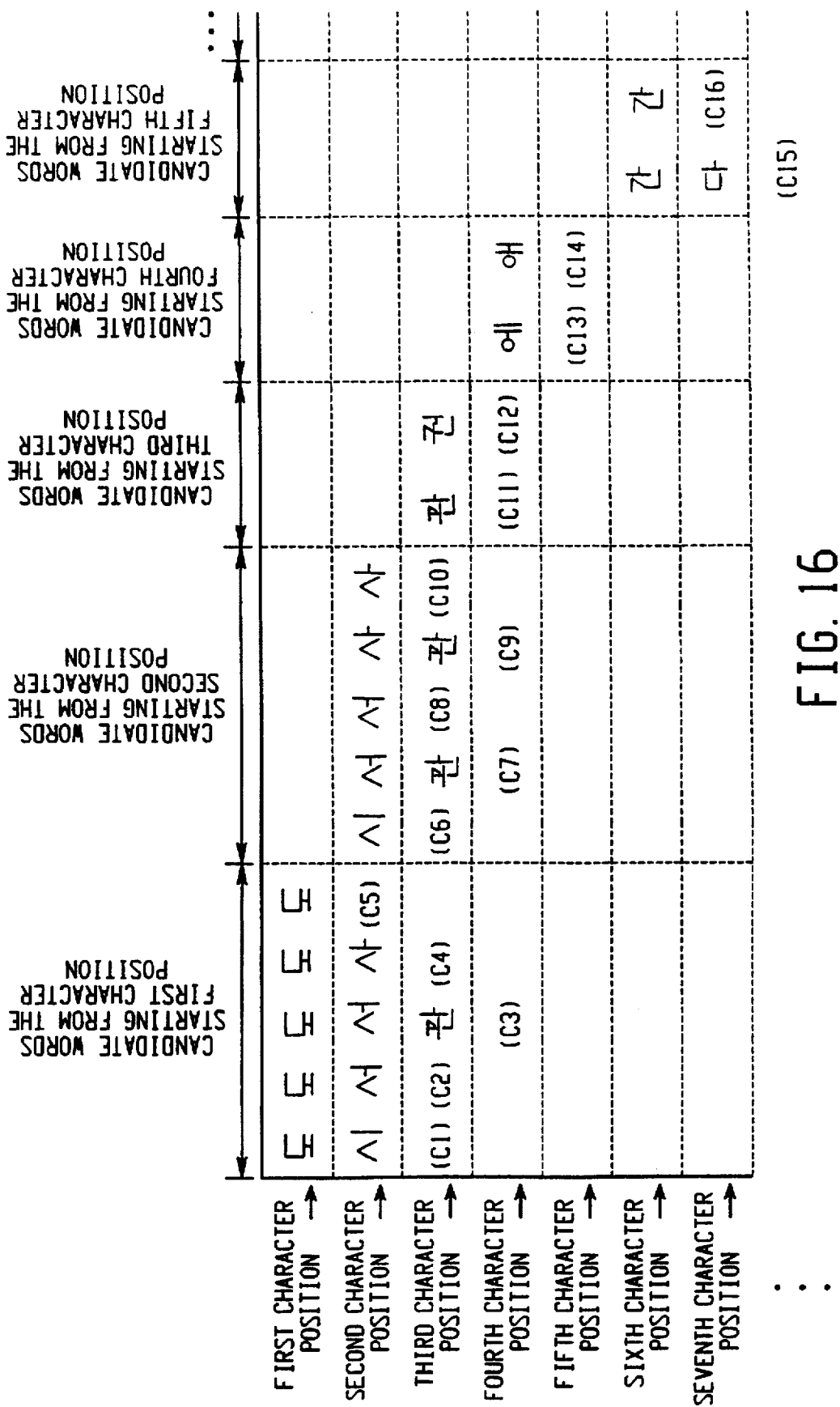
FIG. 16 is a view showing a candidate word lattice generated from the set of candidate characters shown in FIG. 15 and a dictionary.
Figure 18:
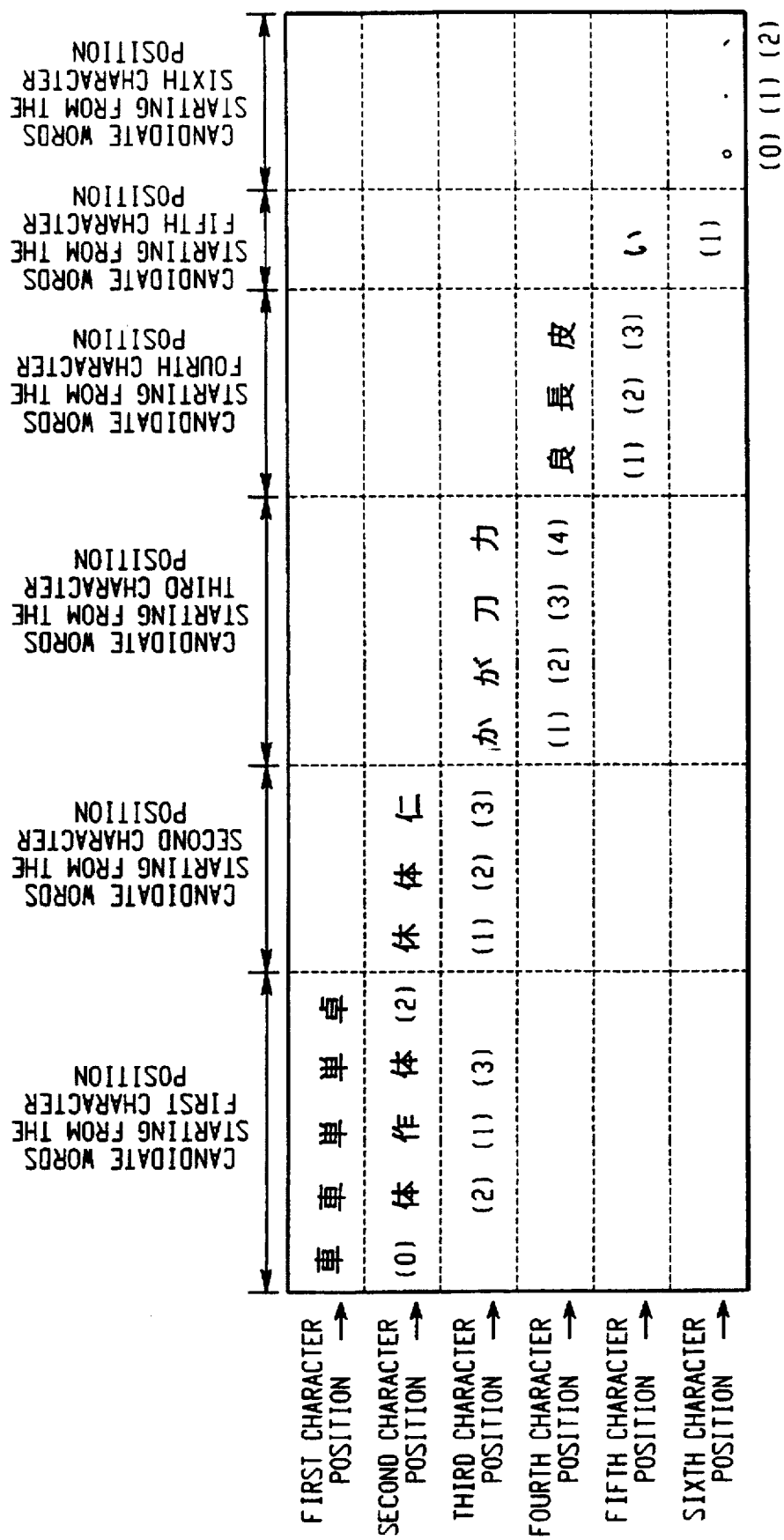
FIG. 18 is a view showing a candidate word lattice generated from the set of candidate characters shown in FIG. 17 and a dictionary.

In FIGS. 8 and 13, the corresponding processes therebetween are as follows; step 801 to step 1301, step 802 to step 1302, step 803 to step 1303, step 8041 to step 13041, step 842 to step 13042, step 805 to step 1306, step 806 to step 1307, step 807 to step 1308, step 809 to step 1310, step 810 to step 1311, and step 812 to step 1314.

Hereafter, the features of the present embodiment will be discussed below. In step 1305, the operation is executed to set a character position used for a key when searching the dictionary. The difference from the method indicated in FIG. 8 is: In the method of FIG. 8, heading L characters of the candidate word whose length is equal to or more than L+1 is required to coincide with a certain key, while this embodiment is arranged to calculate the matching cost of at least one character of a word meeting a specific condition (herein, coincidence with the candidate character with the highest confidence ratio) in step 1302 and select a candidate word from those words in step 1313. For example, if S={1, 2} is given in step 1305, only the words whose first or second character coincide with the first candidate for the first and second character respectively, are processed to calculate a matching cost.

The description will be expanded on the embodiment shown in FIG. 8. In this embodiment, if the word has "ト" at the first character or "ヴ" at the second character, the fifth or later characters are used for the matching. Since the word is limited to have a length equal to or more than 3, the number of these words is reduced into a half in comparison with the normal casting method but is increased in comparison with the method illustrated in FIG. 8. Unlike the method of FIG. 8, however, a right word may be obtained even if a right character is not in the candidates. For example, the second character "ウ" of the "トウモロコシ (corn)" does not exist in the candidate characters, the coincidence of the first character allows the word "トウモ ロコシ (corn)" to be selected for calculating its matching cost and registering the word as the candidates. Hence, the right word may be found in the candidates. Such operation is not possible in accordance with the embodiment shown in FIG. 8. That is, the embodiment according to the present invention achieves a system robust against a low-quality input by a little sacrifice of the matching efficiency. To set the matching position, various methods are considered. For example, the characters to be matched are limited to be within L characters from the word head.

Next, another type of dictionary having entries for verb inflection analysis is possible: In the dictionary, a header is added to an auxiliary verb or a particle as well as an inflectional ending. The embodiment is shown in FIG. 14. This embodiment is arranged to add a conclusive form ending+comma (1402), a conjunctive particle+period (1405), an adverbial form ending+a stem of "～なる" (1404), and an idiomatic expression which is not preferable to be divided in light of its meaning (1401 or 1403). These types of entries retained as a long combination of characters is advantageous in compensating for a missed character.

Moreover, it goes without saying that the present invention is realized by a computer composed of a CPU, a memory, and an I/O unit. As such, the computer is not illustrated in the drawings.

Matching Cost Calculation

As mentioned above, to more efficiently utilize the information about the difference of a confidence ratio, the matching cost of each of the characters composing a word is calculated as follows. Setting the subject character as C and a group of candidate characters S to be matched to the character C as S={((C1, V1), ..., (Ci, Vi), ... (CN, VN)}, the matching cost between C and S is derived by means of the following function K.

If C=Ci, K(C, S)=α·G1(V0, V1, Vi). If no i is found for establishing the relation of C=Ci, K(C, S)=G2 (VN) is given, where α is a positive constant, V0 is a maximum value of a confidence ratio, 0≦VN≦ ... ≦V1≦V0. G1(V0, V1, Vi) is a positively valued function operating to decrease as (V0–V1) is made larger or increase as (V1–Vi) is made larger. G2 is a monotonously non-decreasing function such that G2()≧Z G1 (V0, V1, VN). For example is α=1 is given. G1(V0, V1, Vi) is defined by equation 4.

$$G_1(V_0, V_1, V_i) = \left( \frac{\text{Max}(V_1 - V_{sh}, 0)}{V_0 - V_{sh}} \right) \times (V_1 - V_i) \quad \text{[Expression 4]}$$

where G2()≧G1(V0, V1, ViN).

In the illustrative embodiments, the confidence ratio is digitized to a positive integer ranging from 0 to 255. Hence, V0 is equal to 255. Vsh is a parameter used to ignore the difference of the confidence ratio if the confidence ratio of the first candidate is lower than a certain value.

As a result of using the above-mentioned value of K, the matching cost of the set of candidate characters shown in FIG. 17 to the word '車体 (car body)' is calculated as follows.

$$(225-90)*(255-255)/(255-90)+(125-90)*(125-90)=350/165+2.12$$

The extraction of the group of candidate words based on the "hybrid method" results in greatly reducing the times of searching the dictionary and the number of candidate words obtained from the dictionary, thereby surprisingly improving the post-processing efficiency of the character recognition.

What is claimed is:

1. A character recognition method comprising the steps of:

inputting a digital image including an image of a character sequence;

recognizing the image of the character sequence as a sequence of separated character patterns;

outputting a group of candidate characters, for each of the character patterns, along with a numerical confidence ratio value given by an optical character reader for each output candidate character in the groups wherein the confidence ratio value provides the certainty of each candidate character as a recognition result of each of the character patterns;

extracting a group of candidate words from a word dictionary by using keys, each candidate word starting at a character position p, each key being a candidate character sequence including characters taken from the candidate characters corresponding to each position starting at the character position p;

calculating a word matching cost, for each of the extracted candidate words, by executing a word matching of each candidate word, wherein the word matching cost c(w) for w=C1, C2, ... , Cm is represented as a sum of character matching costs of characters composing the word, wherein the character matching cost of Ci is a positive value calculated from Ci and Si={(Ci1, Vi1) (Ci2, Vi2), ... , (CiN, ViN)}, wherein Cil is the j-th candidate character for Ci and Vij is its confidence ratio;

detecting a most feasible candidate word sequence in accordance with a candidate word set, the calculated word matching cost for each candidate word and a grammatical knowledge relating to a connection cost between two words; and, displaying the character sequence generated by connecting the most feasible candidate word sequence;

wherein the word dictionary contains pairs of entries forming the character sequence and the grammatical knowledge; and, wherein each of the keys is generated from the candidate characters and combinations of the candidate characters, up to a predetermined length L, starting from the position p, words up to the length L being extracted from the dictionary by coincidence with the entries in said dictionary, and words having a length larger than the length L being extracted from the dictionary by coincidence with the first L characters of the entries in the dictionary.

2. A character recognition method according to claim 1, wherein said predetermined length L is set to 2.

3. A character recognition method comprising the steps of:

inputting a digital image including an image of a character sequence;

recognizing the image of the character sequence as a sequence of separated character patterns;

outputting a group of candidate characters, for each of the character patterns, along with a numerical confidence ratio value given by an optical character reader for each output candidate character in the group wherein the confidence ratio value provides the certainty of each candidate character as a recognition result of each of the character patterns;

extracting a group of candidate words from a word dictionary by using keys, each candidate word starting at a character position p, each key being a candidate character sequence including characters taken from the candidate characters corresponding to each position starting at the character position p;

calculating a word matching cost by executing word matching for each extracted candidate word, wherein the word matching cost c(w) for w=C1, C2, . . . , Cm is represented as a sum of character matching costs of characters composing the word, wherein the character matching cost of Ci is a positive value calculated from Ci and Si={(Ci1, Vi1), (Ci2, Vi2), . . . , (CiN, ViN)}, wherein Cij is the j-th candidate character for Ci and Vij is its confidence ratio;

detecting a most feasible candidate word sequence in accordance with a candidate word set, the calculated word matching cost for each candidate word and a grammatical knowledge relating to a connection cost between two words; and, displaying the character sequence generated by connecting the most feasible candidate word sequence;

wherein the dictionary has a plurality of entries, each entry having a verb stem and character sequences of concatenation of two words such as the concatenation of an inflectional ending and the head of the verb stem for an auxiliary verb, a particle, a comma, a period and other words frequently appearing after the inflectional ending.

4. A character recognition method comprising the steps of:

inputting a digital image including an image of a character sequence;

recognizing the image of the character sequence as a sequence of separated character patterns;

outputting a group of candidate characters, for each of the character patterns, along with a numerical confidence ratio value given by an optical reader for each output candidate character in the group, wherein the confidence ratio value provides the certainty of each candidate character as a recognition result of each of the character patterns, extracting a group of candidate words from a word dictionary by using keys, each candidate word starting at a character position p, each key being a candidate character sequence including characters taken from the candidate characters corresponding to each position starting at the character position p;

calculating a word matching cost, for each of the extracted candidate words, by adding all the character matching costs of the characters composing the words wherein the calculation of the character matching cost includes: calculating the matching cost of a character C against a set S={(C1,V1), . . . , (Ci, Vj) . . . , (CN,VN)}, (where Cj is the j-th candidate character for said C, and Vj is its confidence ratio) by using a function K(C,S) having a specific property: when said C equals Ci, K(C,S) increases as (V1−Vi) increases and K(C,S) decreases as V1 decreases;

detecting a most feasible candidate word sequence in accordance with a candidate word set, the calculated word matching cost for each candidate word and a grammatical knowledge relating to a connection cost between two words;

displaying the character sequence generated by connecting the most feasible candidate word sequence;

recording a connecting cost corresponding to the numerical information indicating how easily the words are connected;

ranking the confidence of each of the word sequences composed of a combination of the words contained in a candidate word lattice and calculating the most feasible candidate word sequence by using a linear sum of the word matching cost and the connecting cost;

displaying consecutive character sequences generated by connecting the word sequences.

5. A character recognition method comprising the steps of:

inputting a digital image including an image of a character sequence;

recognizing the image of the character sequence as a sequence of separated character patterns;

outputting a group of candidate characters, for each of the character patterns, along with a numerical confidence ratio value given by an optical character reader for each output candidate character in the group wherein the confidence ratio value provides the certainty of each candidate character as a recognition result of each of the character pattern;

extracting a group of candidate words from a word dictionary by using keys, each candidate word starting at a character position p, each key being a candidate character sequence including characters taken from the candidate characters corresponding to each position starting at the character position p;

calculating a word matching cost, for each of the extracted candidate words, by executing a word matching of each candidate word, wherein the word matching cost c(w) of w=C1, C2, . . . , Cm is represented as a sum of character matching costs of characters composing the word, wherein the character matching cost of Ci is a positive value calculated from Ci and Si={(Ci1, Vi1), (Ci2, Vi2), . . . (CiN, ViN)}, wherein Cij is the j-th candidate character for Ci and Vij is its confidence ratio;

detecting a most feasible candidate word sequence in accordance with a candidate word set, the calculated word matching cost for each candidate word and a grammatical knowledge relating to a connection cost between two words;

displaying the character sequence generated by connecting the most feasible candidate word sequence;

wherein the dictionary contains pairs of entries having a character sequence and grammatical information; and, said each key at the position p for extracting a candidate word is generated from each candidate character and combination of candidate characters up to a predetermined length L starting from the position p, words up to the length L are extracted from the dictionary by coincidence with entries in said dictionary, and words having a length larger than the length L are extracted from the dictionary by coincidence with a p1-th or a p2-th or . . . a pk-th character between a p1-th or a p2-th or . . . a pk-th character of an entry in the dictionary respectively, where p1, p2, . . . , pk are predetermined positive integers.

6. A character recognition method according to claim 5, wherein said predetermined length L is set to 2.

7. A character recognition apparatus comprising:

means for inputting a digital image including an image of a character sequence;

means for recognizing the image of the character sequence as a sequence of separated character patterns;

means for outputting a group of candidate characters corresponding to each of said character patterns and a numerical value of a confidence ratio given by an optical character reader to each of said output candidate characters in the group, wherein the confidence ratio value provides the certainty of each candidate character as a recognition result of each of the character pattern;

means for extracting a group of candidate words starting from each of character position, p, from a word dictionary by using keys, in which a key is a candidate character sequence each character of which is taken from said candidate characters corresponding to each position starting from p;

means for calculating word matching cost by executing word matching of each candidate word of said all extracted candidate words, wherein the word matching cost $c(w)$ of $w = C1, C2, \ldots, Cm$ is represented as a sum of character matching costs of characters composing the word, wherein the character matching cost of $Ci$ is a positive value calculated from $Ci$ and $Si = \{(Ci1, Vi1), (Ci2, Vi2), \ldots, (CiN, ViN)\}$ wherein $Cij$ is the j-th candidate character for $Ci$ and $Vij$ is its confidence ratio;

means for detecting the most feasible candidate word sequence in accordance with said candidate word set, calculated word matching cost for each candidate word and grammatical knowledge relating to a connection cost between two words;

means for displaying a character sequence generated by connecting said word sequence;

wherein said dictionary contains pairs of an entry, which is a character sequence, and grammatical information therefor; and, said each key at the position p for extracting a candidate word is generated from each candidate character and combination of candidate characters up to predetermined length L starting from said position p, words up to said length L are extracted from said dictionary by coincidence with entries in said dictionary, and words length of which is larger than said L are extracted from said dictionary by coincidence with their first L characters and entries in said dictionary.

* * * * *